US012345170B2

(12) United States Patent
Nazare et al.

(10) Patent No.: US 12,345,170 B2
(45) Date of Patent: Jul. 1, 2025

(54) TURBOMACHINE WITH THRUST BEARING SEAL PLATE HOUSING MEMBER HAVING WORKING FLUID FLOW APERTURE

(71) Applicant: Garrett Transportation I Inc., Torrance, CA (US)

(72) Inventors: Kiran Somashekar Rao Nazare, Bangalore (IN); Poomkuzhimannil John, Bangalore (IN); Matej Kopecky, Pardubice-Rosice (CZ)

(73) Assignee: GARRETT TRANSPORTATION I INC., Torrance, CA (US)

(*) Notice: Subject to any disclaimer, the term of this patent is extended or adjusted under 35 U.S.C. 154(b) by 33 days.

(21) Appl. No.: 18/351,598

(22) Filed: Jul. 13, 2023

(65) Prior Publication Data

US 2024/0401499 A1 Dec. 5, 2024

(30) Foreign Application Priority Data

Jun. 1, 2023 (IN) ............................ 202311037871

(51) Int. Cl.

| | |
|---|---|
| ***F01D 25/16*** | (2006.01) |
| ***F01D 11/02*** | (2006.01) |
| ***F04D 17/12*** | (2006.01) |
| ***F04D 25/06*** | (2006.01) |
| ***F04D 29/42*** | (2006.01) |

(52) U.S. Cl.

CPC .............. *F01D 25/16* (2013.01); *F01D 11/02* (2013.01); *F04D 17/12* (2013.01); *F04D 25/06* (2013.01); *F04D 29/4206* (2013.01); *F05D 2230/60* (2013.01); *F05D 2240/52* (2013.01); *F05D 2240/55* (2013.01)

(58) Field of Classification Search

CPC .......... F01D 25/16; F01D 11/02; F04D 17/12; F04D 1/00; F04D 25/06; F04D 29/051; F04D 29/42; F04D 29/4206; F05D 2240/52; F05D 2230/60; F05D 2240/55

See application file for complete search history.

(56) References Cited

U.S. PATENT DOCUMENTS

| | | | | |
|---|---|---|---|---|
| 4,472,107 A * | 9/1984 | Chang | F01D 3/04 415/170.1 |
| 6,017,184 A | 1/2000 | Aguilar et al. | |
| 8,931,304 B2 | 1/2015 | Beers et al. | |
| 9,856,886 B2 | 1/2018 | Kares et al. | |
| 10,233,756 B2 * | 3/2019 | Chen | F04D 29/284 |
| 2002/0097929 A1 | 7/2002 | Choi et al. | |
| 2015/0167690 A1 * | 6/2015 | V | F04D 29/624 415/170.1 |

(Continued)

*Primary Examiner* — Elton K Wong
(74) *Attorney, Agent, or Firm* — LORENZ & KOPF, LLP

(57) ABSTRACT

A turbomachine includes a housing, a rotating group that is housed within the housing, and a fluid bearing system with a thrust member. The turbomachine further includes a compressor stage configured to receive a fluid from an area within the housing. Also, the turbomachine includes a seal plate of the housing. The seal plate includes a first face and a second face. The first face has a flow surface that at least partly defines a fluid flow path toward the compressor wheel. The second face has a thrust member support surface configured to support the thrust member during rotation of the rotating group. The seal plate includes an aperture that fluidly connects the area to the fluid flow path.

19 Claims, 5 Drawing Sheets

(56) References Cited

U.S. PATENT DOCUMENTS

| | | | | |
|---|---|---|---|---|
| 2018/0209435 | A1 | 7/2018 | Fujii | |
| 2018/0274527 | A1 | 9/2018 | Snell | |
| 2023/0332618 | A1* | 10/2023 | Okano | F04D 29/4206 |

* cited by examiner

TURBOMACHINE WITH THRUST BEARING SEAL PLATE HOUSING MEMBER HAVING WORKING FLUID FLOW APERTURE

CROSS REFERENCE TO RELATED APPLICATION

This application claims priority to Indian Provisional Patent Application No. 202311037871, filed Jun. 1, 2023, the entire content of which is incorporated by reference herein.

TECHNICAL FIELD

The present disclosure relates, generally, to a turbomachine and relates, more particularly, to a turbomachine with a thrust bearing seal plate housing member having a working fluid flow aperture.

BACKGROUND

Turbomachines may be useful in vehicles and/or other environments. HVAC systems, for example, may include a compressor device for providing temperature-controlled air to a passenger compartment.

Preferably, these turbomachines operate at high efficiency in a variety of conditions. Also, these devices are preferably compact and lightweight. Moreover, these turbomachines preferably have a low part count, are relatively easy to make and assemble, and/or provide other manufacturing efficiencies.

However, it may be difficult to maintain high efficiency in some conditions. Furthermore, operating efficiency may be negatively affected by leakage flow of the working fluid. Seals and other features may be difficult to incorporate without significantly increasing weight, size, cost, part count, assembly time, etc.

Accordingly, there remains a need for a turbomachine that operates at high efficiency and that has a relatively low weight, size, and part count. Furthermore, there remains a need for such a turbomachine that also provides manufacturing efficiencies.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a turbomachine is disclosed that includes a housing, a rotating group that is housed within the housing, and a fluid bearing system with a thrust member. The fluid bearing system is configured to support the rotating group for rotation within the housing about an axis. The thrust member is configured to support the rotating group against thrust loads. The turbomachine further includes a compressor stage that includes a compressor wheel of the rotating group that is housed within a compressor housing of the housing. The compressor stage is configured to receive a fluid from an area within the housing. Also, the turbomachine includes a seal plate of the housing. The seal plate includes a first face and a second face. The first face has a flow surface that at least partly defines a fluid flow path toward the compressor wheel. The second face has a thrust member support surface configured to support the thrust member during rotation of the rotating group. The seal plate includes an aperture that fluidly connects the area to the fluid flow path.

In another embodiment, a method of manufacturing a turbomachine is disclosed. The method includes providing a housing, providing a rotating group, and housing the rotating group within the housing. The method also includes supporting, with a fluid bearing system, the rotating group within the housing for rotation about an axis of rotation. The fluid bearing system includes a thrust member that is configured to support the rotating group against thrust loads. The method further includes defining a compressor stage that includes a compressor wheel of the rotating group that is housed within a compressor housing of the housing. The compressor stage is configured to receive a fluid from an area within the housing. The housing includes a seal plate that includes a first face and a second face. The first face has a flow surface that at least partly defines a fluid flow path toward the compressor wheel. The second face has a thrust member support surface configured to support the thrust member during rotation of the rotating group. The seal plate includes an aperture that fluidly connects the area to the fluid flow path.

In a further embodiment, a compressor device is disclosed that includes a housing and a rotating group that is housed within the housing. The rotating group and the housing cooperate to define a first compressor stage and a second compressor stage. Furthermore, the compressor device includes a fluid bearing system with a thrust member. The fluid bearing system is configured to support the rotating group for rotation within the housing about an axis, and the thrust member is configured to support the rotating group against thrust loads on the rotating group. Moreover, the compressor device includes a motor stage including an electric motor included in a motor cavity of the housing. The electric motor is operatively connected to the rotating group for driving rotation thereof. The first compressor stage includes a first compressor wheel of the rotating group that is housed within a first compressor housing of the housing. The first compressor stage is configured to receive a fluid from an area within the housing. The second compressor stage includes a second compressor wheel of the rotating group that is housed within a second compressor housing of the housing. The second compressor stage is configured to receive the fluid from the first compressor stage. The compressor device also includes a seal plate of the housing. The seal plate includes a first face and a second face. The first face has a flow surface that at least partly defines a fluid flow path toward the first compressor wheel. The second face has a thrust member support surface configured to support the thrust member during rotation of the rotating group. The seal plate includes a through-hole that fluidly connects the motor cavity to the fluid flow path.

Furthermore, other desirable features and characteristics of the present disclosure will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the present disclosure and not to limit the scope of the present disclosure, which is defined by the claims. Furthermore, there is no intention to be bound by any expressed or implied theory presented in the preceding technical field, background, brief summary, or the following detailed description.

Broadly, example embodiments disclosed herein include a turbomachine, such as a compressor device. The turbomachine may include a seal plate that seals a thrust member of a fluid bearing system within a pocket in the turbomachine and that supports the same as the rotating group rotates within the housing. The seal plate may also include a flow surface that defines a flow path for fluid flowing toward a compressor stage of the turbomachine. The seal plate may also include one or more apertures that fluidly connect the flow path to an upstream area, such as a motor cavity, within the turbomachine.

The seal plate and the arrangement of the seal plate within the turbomachine may provide a number of advantages. For example, the turbomachine may be relatively compact and lightweight because of these features. Furthermore, the seal plate may provide fluid flow through the turbomachine that increases efficiency and performance of the turbomachine.

Figure 1:
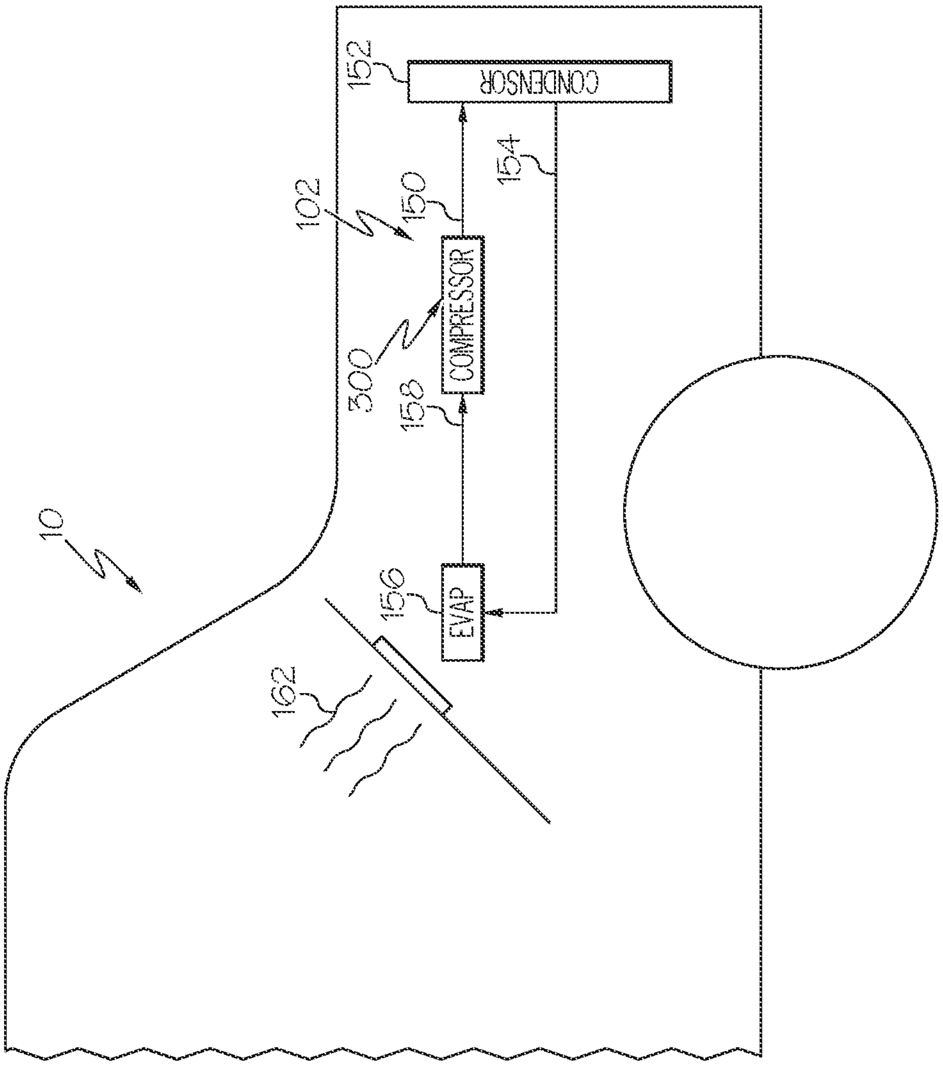
FIG. 1 is a schematic illustration of a fluid system with a compressor device according to example embodiments of the present disclosure.

FIG. 1 is a schematic view of front end of a vehicle 10, such as a passenger car. The vehicle 10 may include a fluid system 102, such as a coolant fluid system, an air conditioning system, refrigerant cycle for an HVAC system, etc. The fluid system 102 may include a compressor device 300 configured according to example embodiments of the present disclosure. The compressor device 300 may compress a working fluid, such as a fluid refrigerant, and the pressurized fluid stream 150 may flow toward a condenser 152 of the fluid system 102. The condenser 152 may exchange heat with a surrounding fluid, and a resulting fluid stream 154 may flow toward an evaporator 156. The evaporator 156 may also be configured for heat exchange with a surrounding fluid, and the evaporator 156 may output a resulting input flow 158 back to the compressor device 200.

It will be appreciated that the evaporator 156 and/or condenser 152 may be operatively coupled to one or more fans (not shown) for exchanging heat with the surrounding fluid. It will also be appreciated that the fluid system 102 may include other standard components, such as an expansion valve, drier, etc. for use as the working fluid moves through the thermodynamic cycle within the fluid system 102.

In the embodiment illustrated, the evaporator 156 may be used to provide temperature-controlled air 162 to the cabin of the vehicle 10. In some embodiments, the fluid system 102 may be provided in an electric vehicle, a solar-powered car, a fuel-cell vehicle, or other vehicle 10.

It will also be appreciated that the compressor device 300 may be configured differently, may be incorporated within a different fluid system, etc., without departing from the scope of the present disclosure. Furthermore, features of the present disclosure may be included on a different turbomachine, such as an electric motor-assisted turbocharger, without departing from the scope of the present disclosure.

Figure 2:
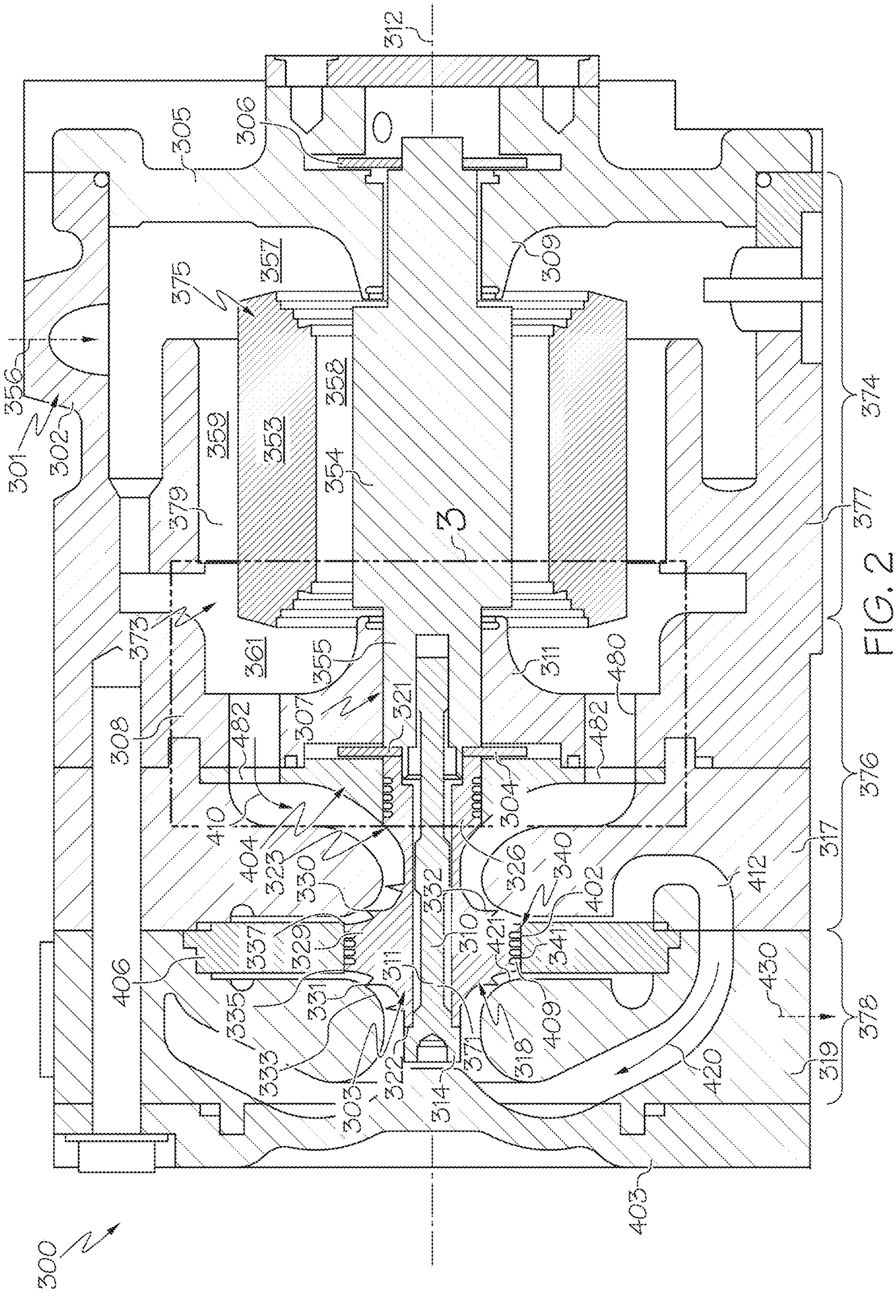
FIG. 2 is a cross-sectional view of a turbomachine, such as the compressor device of FIG. 1, configured according to additional example embodiments of the present disclosure.

As shown in FIG. 2, the compressor device 300 may generally include a housing assembly 301 and a rotating group 303. The rotating group 303 may be supported for rotation within the housing assembly 301 about an axis 312 of rotation by a bearing system 307. The bearing system 307 may be of any suitable type. In some embodiments, the bearing system 307 may be a fluid bearing system, such as a gas-lubricated bearing system where the gas is air, refrigerant, or other gas.

Generally, the compressor device 300 may be configured as a multi-stage compressor device with an operatively coupled e-machine 373. The e-machine 373 may be configured as an electric motor 375. Thus, the compressor device 300 may include a motor stage 374, a first compressor (low pressure) stage 376, and a second compressor (high pressure) stage 378. The motor stage 374, the first compressor stage 376, and the second compressor stage 378 may be arranged sequentially along the axis 312. In some embodiments, the first compressor stage 376 may be disposed axially between the motor stage 374 and the second compressor stage 378. The rotating group 303 and housing assembly 301 may be configured to cooperatively define the motor stage 374, the first compressor stage 376, and the second compressor stage 378.

The electric motor 375 of the motor stage 374 may be housed within a motor housing 377 of the housing assembly 301. The motor housing 377 may define a motor cavity 379, which receives a stator member 353 and a rotor member 354 of the motor 375. The stator member 353 may be fixed to the motor housing 377, and the rotor member 354 may be supported on a shaft member 355 of the rotating group 303.

The motor housing 377 may include an outer portion 302 that extends about the motor 375 in the circumferential direction. The motor housing 377 may also include a first axial wall portion 305 and a second axial wall portion 308 that are fixed to the outer portion 302 and disposed on opposite axial ends of the motor 375. The outer portion 302 and second axial wall portion 308 may be integrally connected so as to define a unitary member, and the first axial wall portion 305 may be a cap or cover that is attached to the outer portion 302 to close off the motor cavity 379.

In some embodiments, the first axial wall portion 305 may include a first journal member 309 of the bearing system 307, and the second axial wall portion 308 may include a second journal member 311 of the bearing system 307. The first journal member 309 and second journal member 311 support respective portions of the shaft member 355 and may support against radial loads on the shaft member 355 during operation.

The motor housing 377 may include at least one fluid inlet 356 extending from outside the motor housing 377 and into the motor cavity 379 therein. The fluid inlet 356 may receive the input flow 158 (FIG. 1). Also, the motor cavity 379 and/or the motor 375 may be configured to define one or more fluid cavities, flow paths, flow channels, passageways, etc. For example, there may be a first axial chamber 357 defined at one axial end of the motor 375, an inner radial passage 358 defined in the gap between the stator member 353 and rotor member 354, an outer radial passage 359 defined between the stator member 353 and the motor housing 377, and a second axial chamber 361 defined at the opposite axial end of the motor 375.

Accordingly, during operation, fluid coolant may be provided from the inlet 356 into the motor cavity 379. This fluid may flow in a downstream direction into the first axial chamber 357, generally in the axial direction along the inner and outer radial passages 358, 359, and into the second axial chamber 361. The coolant may cool the motor 375, the bearing system 307, and/or other components via this flow through the motor stage 374. This fluid may flow into the first compressor stage 376 and further downstream into the second compressor stage 378 as will be discussed.

The rotating group 303 may further include a wheel and seal member 318, which may extend axially through both the first and second compressor stages 376, 378. As shown, the wheel and seal member 318 may be a unitary, monolithic, one-piece part that includes a plurality of integrally attached features. For example, the wheel and seal member 318 may include a first wheel feature 330 and a second wheel feature 331, which may be disposed in a back-to-back arrangement. More specifically, the first wheel feature 330 may include a first front face 332 with respective blades, and the second wheel feature 331 may include a second front face 333 with respective blades. The front faces 332, 333 of the wheel features 330, 331 may face away in opposite axial directions. The wheel and seal member 318 may include a middle extension 329 that extends between the wheel features 330, 331 and that is common to both wheel features 330, 331. In some embodiments, an outer radial edge 337 of the first wheel feature 330 may have substantially the same radius as an outer radial edge 335 of the second wheel feature 331. An outer radial area 341 of the wheel and seal member 318 may be defined on the middle extension 329 between the outer radial edges 337, 335 of the wheel features 330, 331 and may be disposed substantially at the same radius of the outer radial edges 335, 337.

A seal feature 340 may be integrally defined on the outer radial area 341. Thus, the seal feature 340 may be defined axially behind both the first face 332 of the first wheel feature 330 and the second face 333 of the second wheel feature 331. The seal feature 340 may comprise a plurality of annular recesses that are recessed into the outer radial area 341 in a direction normal to the axis 312. The recesses may be spaced substantially evenly apart along the axis 312. Between the recesses, the seal feature 340 may include a plurality of annular flanges that are disposed perpendicular to the axis 312. The flanges may be thinner than the width of the annular recesses.

As shown in FIG. 2, the second face 333 of the second wheel feature 331 may be contoured and may terminate at a second end 322 of the wheel and seal member 318. The second end 322 may be disposed substantially perpendicular to the axis 312.

Figure 3:
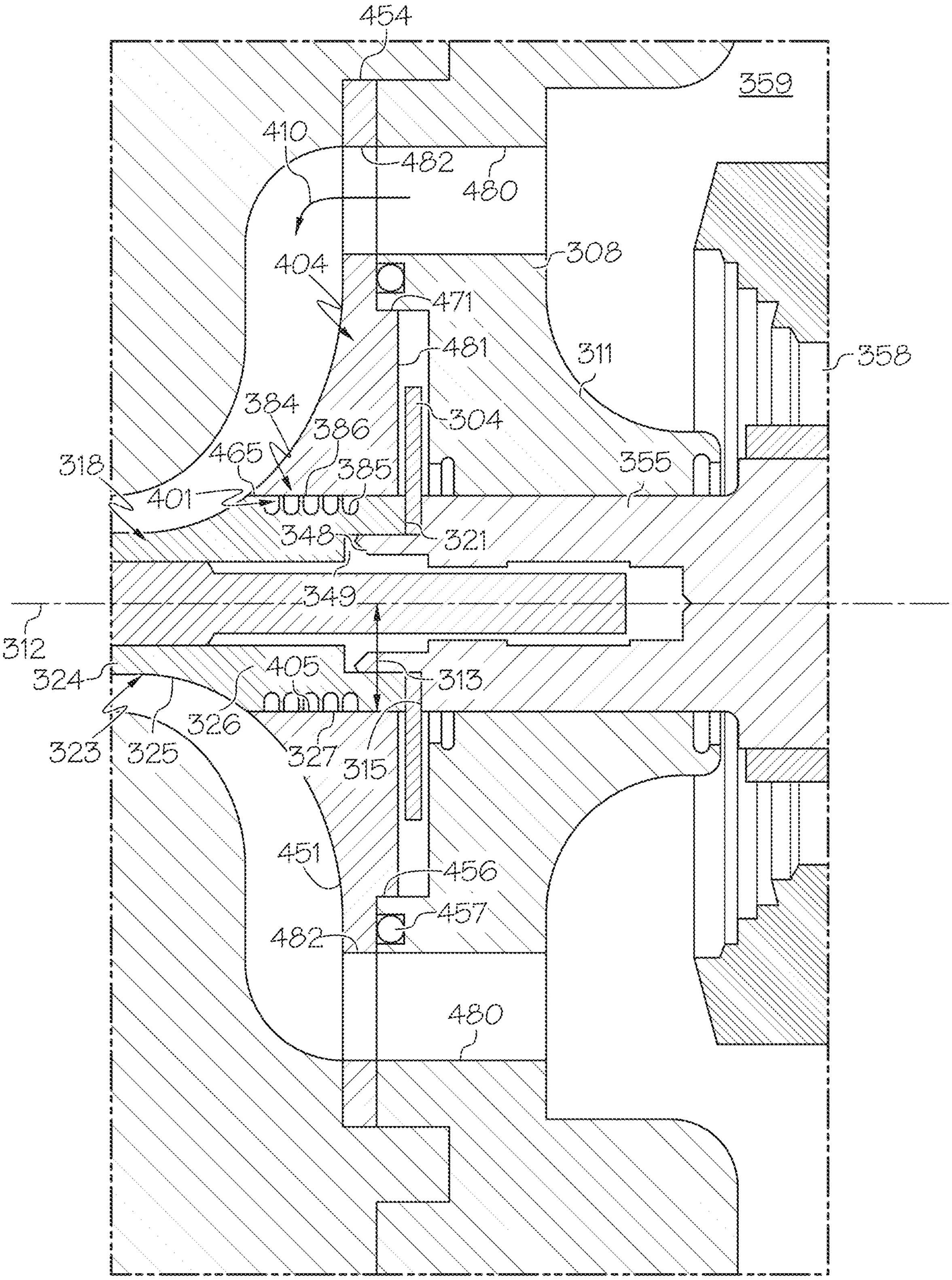
FIG. 3 is a detail cross-sectional view of a portion of the turbomachine of FIG. 2.

The wheel and seal member 318 may further include an extension 323 (FIGS. 2 and 3). The extension 323 may be generally cylindrical and hollow. The extension 323 may extend axially from the face 332 of the first wheel member 330 (FIG. 2) and may terminate at a first end 321 of the wheel and seal member 318.

As shown in FIG. 3, the extension 323 may include a flow inlet feature 324, which may be hollow, cylindrical, and relatively thin-walled. The flow inlet feature 324 may extend axially away from the first face 332 of the first wheel feature 330. The flow inlet feature 324 may also include a contoured flow surface 325 that is contoured to define a fluid flow path as will be discussed. The flow surface 325 may extend substantially in the axial direction and may contour concavely in the radial direction proximate the first end 321.

The extension 323 may also include a seal portion 326. The seal portion 326 may include an outer diameter area 327 with a diameter that is greater than that of the flow inlet feature 324. The outer diameter area 327 may have a substantially constant outer radius 313, and the flow surface 325 may contour so as to gradually reduce in radius from the outer radius 313.

The outer diameter area 327 may include a second seal feature 384. The second seal feature 384 may be integrally defined on the outer diameter area 327. The second seal feature 384 may comprise a plurality of annular recesses 385 that are recessed into the outer diameter area 327. The recesses 385 may be spaced substantially evenly apart along the axis 312. The second seal feature 384 may also include a plurality of annular flanges 386 that are defined between adjacent pairs of the recesses 385. The flanges 386 may be disposed perpendicular to the axis 312. Individual ones of the flanges 386 may be thinner than the width of ones of the annular recesses 385.

As shown in FIG. 3, the extension 323 may also include a receiving opening 349 at the first end 321. The receiving opening 346 may be centered on the axis 312 and may have a widened inner diameter for receiving a stub end 348 of the shaft member 355.

The bearing system 307 may further include a thrust member 304. The thrust member 304 may be annular and disc shaped. The thrust member 304 may be received upon the stub end 348. Also, the thrust member 304 may be disposed between and may abut the first end 321 and a step 315 of the shaft member 355 to secure the thrust member 304 to the rotating group 303. The bearing system 307 may include a second thrust member 306 (FIG. 2). The second thrust member 306 may be substantially similar to the thrust member 304, but the second thrust member 306 may be disposed on the opposite end of the shaft member 355.

Referring back to FIG. 2, the rotating group 303 may further include fastener 371 that secures the wheel and seal member 318 to the rest of the rotating group 303. A head 314 of the fastener 371 may abut against the second end 322, and a shaft portion 310 of the fastener 371 may extend through the first and second wheel features 330, 331 and the extension 323 to be received within and fasten to the shaft member 355. Thus, the rotating group 303 may be cooperatively defined by, at least, the rotor member 354, the shaft member 355, the thrust member 304, the wheel and seal member 318, and the fastener 371.

The housing assembly 301 may house the integrated wheel and seal member 318, and the wheel and seal member 318 may extend through both the first compressor stage 376 and the second compressor stage 378. The housing assembly 301 may include a first stage outer housing 317, a second stage outer housing 319, and an end cap 403, which may be stacked and fixed axially over the wheel and seal member 318.

Figure 4:
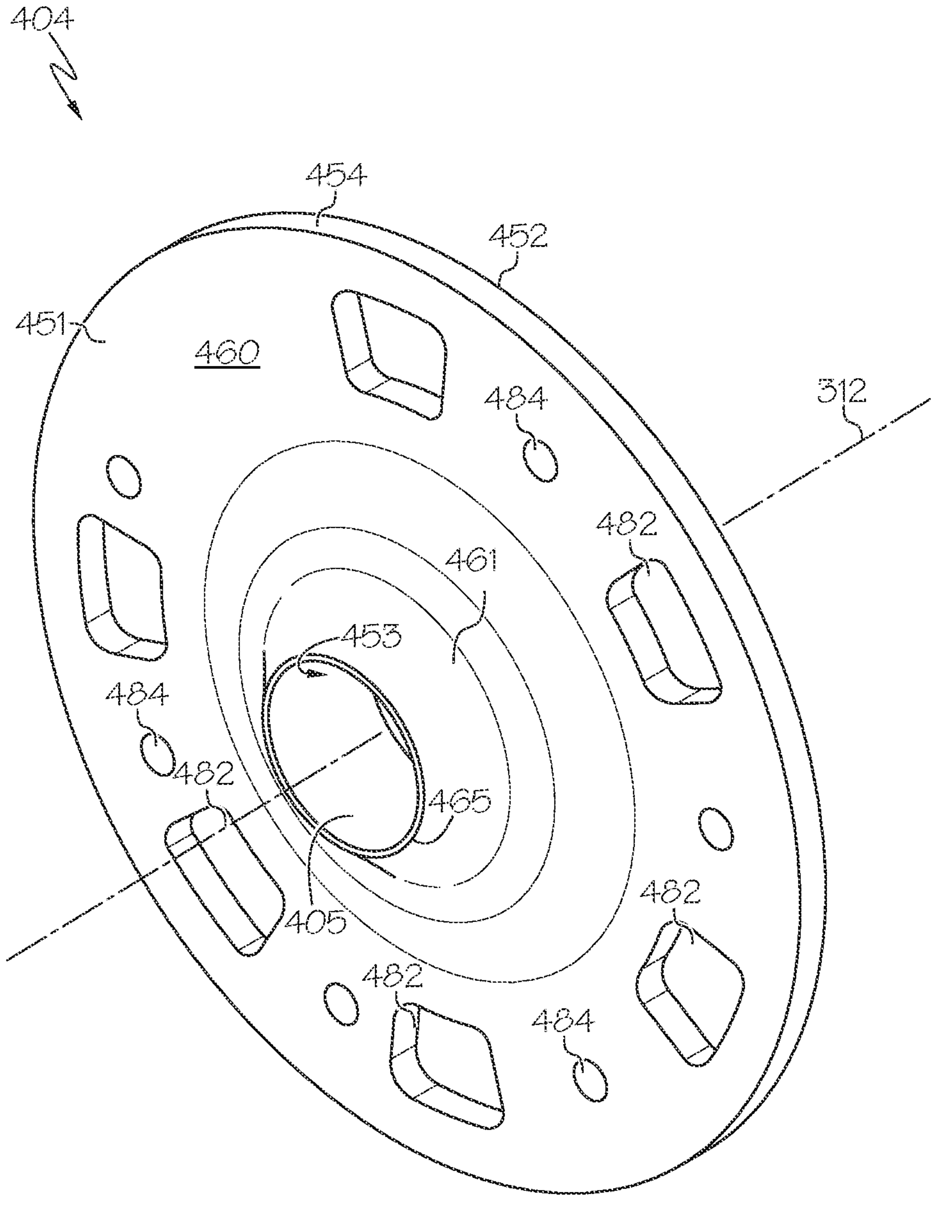
FIG. 4 is an isometric view of a seal plate of the turbomachine of FIGS. 2 and 3.

Furthermore, the housing assembly 301 may include a seal plate 404. As shown in FIGS. 3 and 4, the seal plate 404 may be annular in shape and substantially flat. The seal plate 404 may include a first face 451, a second face 452, an outer radial edge 454, and a center hole 453 defined by an inner radial area 405. The seal plate 404 may be a unitary (one-piece) part made from metal, composite material, or other material.

The first face 451 may be contoured and shaped to define part of a fluid flow path as will be discussed. For example, the first face 451 may include an outer radial portion 460 and an inner radial portion 461. The outer radial portion 460 may be disposed in a plane that is substantially normal to the axis 312 so as to face substantially along the axis 312. The inner radial portion 461 may be smooth, continuous, and flush with the outer radial portion 460. The inner radial portion 461 may be contoured concavely, gradually curving and projecting axially as it extends away from the outer radial portion 460. The inner radial portion 461 may contour gradually from the outer radial portion 460 to project axially along the axis 312, eventually terminating at a circular lip 465.

The second face 452 of the seal plate 404 may face in an opposite axial direction from the outer radial portion 460 of the first face 451. A majority of the second face 452 may be disposed in one or more planes that are substantially normal to the axis 312. The second face 452 may include a step 471 (FIG. 3) that reduces the thickness (measured axially) of the seal plate 404 proximate the outer radial edge 454.

The outer radial edge 454 may be relatively thin and may extend annularly about the axis 312. The outer radial edge 454 may be smooth and continuous as it extends in this circumferential direction. The outer radial edge 454 may extend axially between the first and second faces 451, 452.

The inner radial area 405 may define the center hole 453 with a circular cross section (taken normal to the axis 312). Accordingly, the inner radial area 405 may be smooth and continuous in the circumferential direction. The center hole 453 may be centered on the axis 312 and may extend at a constant diameter between the first face 451 and the second face 452 of the seal plate 404.

The seal plate 404 may further include at least one fastener aperture 484. As shown in FIG. 4, there may be a plurality of fastener apertures 484, such as round through-holes that extend axially between the first face 451 and the second face 452 on the outer radial portion 460. In some embodiments, there may be a total of six fastener apertures 484 spaced apart and arranged about the axis 312.

The seal plate 404 may additionally include at least one flow aperture 482. As shown in FIG. 4, there may be a plurality of flow apertures 482. In some embodiments, the flow apertures 482 may be through-holes that extend axially between the first face 451 and the second face 452 on the outer radial portion 460 of the seal plate 404. At least one of the flow apertures 482 may have a substantially quadrilateral, oblong, or otherwise elongate cross-sectional shape (taken normal to the axis 312). In some embodiments, at least one flow aperture 482 may include a first side 491, a second side 492, a third side 493, and a fourth side 494. The first and second sides 491, 492 may be spaced apart in the circumferential direction, and the third and fourth sides 493, 494 may extend therebetween. The third and fourth sides 493, 494 may be spaced apart in the radial direction with the fourth side 494 positioned closer to the outer radial edge 454 than the third side 493. The third and fourth sides 493, 494 may be curved and substantially centered on the axis 312. Also, there may be respective ones of the fastener apertures 484 disposed angularly between neighboring pairs of the flow apertures 482.

The seal plate 404 may be attached to the second axial wall portion 308 of the motor housing 377. The seal plate 404 may be attached to the second axial wall portion 308 via respective fasteners that extend through the plurality of fastener apertures 484. Also, the first stage outer housing 317 may be attached to the motor housing 377 such that the seal plate 404 is axially disposed therebetween.

In some embodiments, the seal plate 404 may be centered on the axis 312 in this position. Also, the flow apertures 482 may be aligned with and may fluidly connect to respective through-holes 480 of the second axial wall portion 308. Accordingly, the flow apertures 482 may fluidly connect to an upstream area within the motor cavity 379. More specifically, the flow apertures 482 may align and fluidly connect to the through-holes 480, thereby fluidly connecting to the motor cavity 379. The first face 451 of the seal plate 404 may be separated at a distance from the surrounding first stage outer housing 317 to define a contoured first stage flow path 410 that is fed from the motor cavity 379, through the through-holes 480, and the flow apertures 482.

Figure 5:
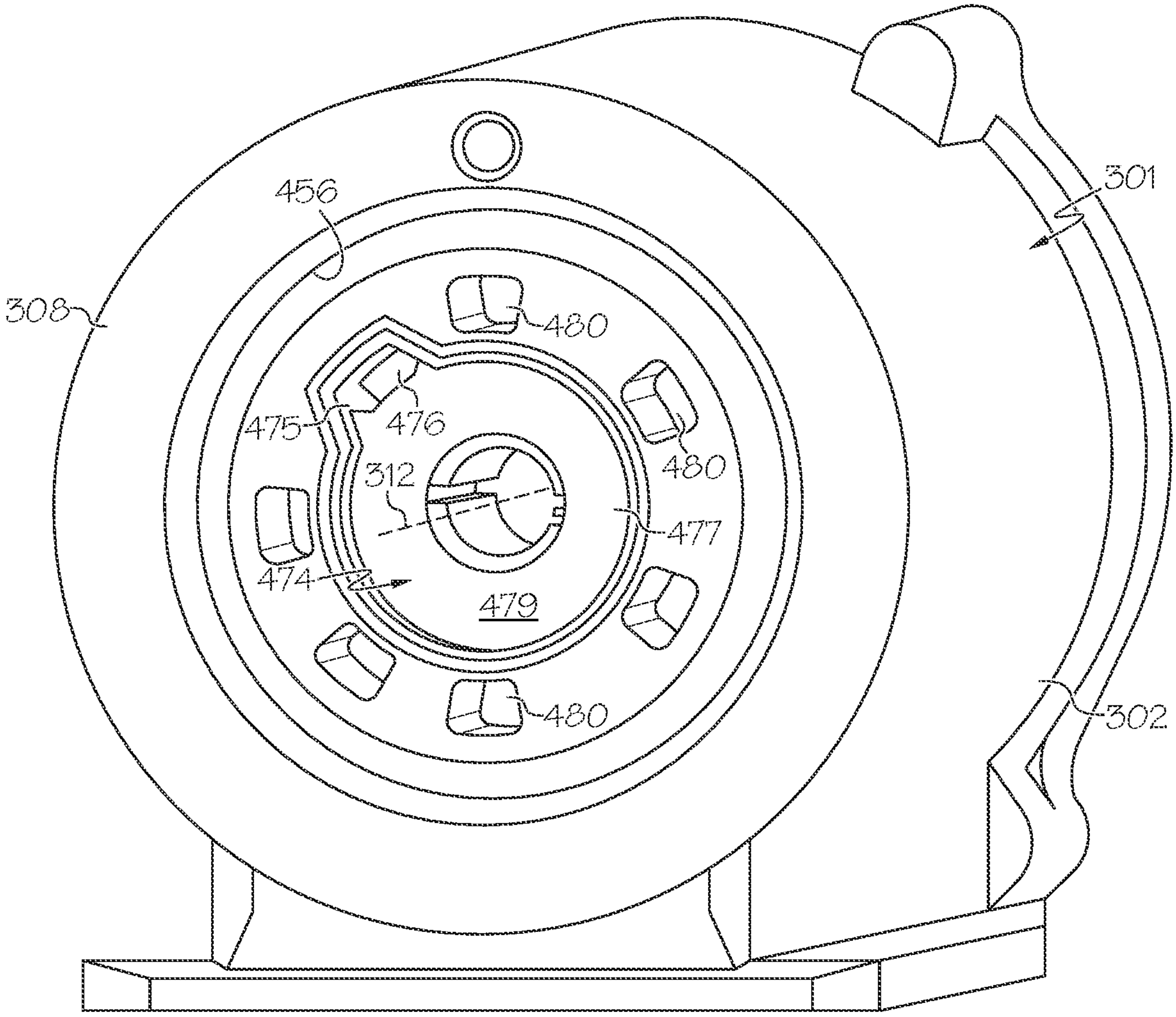
FIG. 5 is an isometric view of the turbomachine of FIGS. 2 and 3, part of which is hidden for clarity.

Also, in this position, the second face 452 of the seal plate 404 may seal to the second axial wall portion 308 and may cooperate with the second axial wall portion 308 to enclose and surround the thrust member 304 of the bearing system 307. For example, as shown in FIG. 5, the second axial wall portion 308 may include a recess 474. The recess 474 may be defined by a recessed surface 479 that is recessed axially into the second axial wall portion 308. The recess 474 may include a thrust pocket 477 that is annular and centered on the axis 312. The recess 474 may also include an inlet area 475 that is eccentric to the axis 312. The inlet area 475 may include a fluid inlet 476. The second face 452 of the seal plate 404 may include a thrust member support surface 481 that is flat and planar and that is disposed normal to the axis 312. The seal plate 404 may be attached with the thrust member support surface 481 continuously covering the inlet area 475 and the thrust pocket 477.

Also, the thrust member 304 may be received within the thrust pocket 477 as shown in FIGS. 2 and 3. The fluid inlet 476 may provide fluid to the thrust member 304 to support the thrust member 304 against thrust loading during operation.

The step 471 may be received in a corresponding inset 456 (FIG. 5) of the wall portion 308. Additionally, there may be a compressible seal member 457 (e.g., a resilient O-ring) provided proximate the step 471 and inward radially from the flow apertures 482. The seal member 457 may continuously extend around and surround the thrust pocket 477 and the inlet area 475, and the seal member 457 may seal between the seal plate 404 and the wall portion 308.

Additionally, the inner radial area 405 may receive the extension 323 and may oppose the second seal feature 384. Thus, the inner radial area 405 and the second seal feature 384 may define a first seal 401 with a tortuous flow path that extends generally axially between the thrust member 304 and the flow surface 325.

Referring back to FIG. 2, the housing assembly 301 may further include a back plate 406. The back plate 406 may be annular and may be fixed between the first stage outer housing 317 and the second stage outer housing 319. The back plate 406 may include a smooth inner radial area 409 that opposes the seal feature 340. Accordingly, the inner radial area 409 and the seal feature 340 may define a second seal 402 with a tortuous flow path that extends generally axially between the first face 332 and the second face 333.

As shown in FIGS. 2 and 3, the seal plate 404, the first stage outer housing 317, and the flow surface 325 may define the first stage flow path 410. The first stage flow path 410 may be fluidly connected to the second axial chamber 361. The first stage flow path 410 may extend in a downstream direction from the second axial chamber 361 toward the first face 332 of the first wheel feature 330. The first stage flow path 410 may flow axially through the seal plate 404 and may turn radially inward to contour along the flow surface 325 and turn back axially along the flow surface 325 of the extension 323 toward the first face 332 of the first wheel feature 330. The fluid may flow along the first face 332 and the shroud surface 362 to be compressed and directed toward a first compressor outlet 412.

The outlet 412 may extend through the first stage outer housing 317 and may turn back toward the second stage outer housing 319. The second stage outer housing 319 may define a second stage flow path 420 that contours inwardly radially toward the axis 312 where the second stage flow path 420 turns axially toward the second face 333 of the second wheel feature 331. Moving further downstream, the second stage flow path 420 may be defined between the second face 333 and a second shroud surface 421 of the second stage outer housing 319. Fluid in the second stage flow path 420 may flow further downstream in the radial and circumferential direction before being discharged via a fluid outlet 430.

Thus, the compressor device 300 may provide efficient operation. Also, the seal plate 404 and its arrangement within the compressor device 300 provides a number of advantages. For example, the compressor device 300 may be highly compact and lightweight because of the features of the present disclosure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbomachine comprising:

a housing;

a rotating group that is housed within the housing;

a fluid bearing system with a thrust bearing member fixed to the rotating group, the fluid bearing system configured to support the rotating group for rotation within the housing about an axis with the thrust bearing member configured to support the rotating group against thrust loads;

a compressor stage that includes a compressor wheel of the rotating group that is housed within a compressor housing of the housing, the compressor stage configured to receive a fluid from an area within the housing;

a seal plate of the housing, the seal plate including a first face and a second face, the first face having a flow surface that at least partly defines a fluid flow path toward the compressor wheel, the second face having a thrust bearing member support surface; and a wall portion of the housing, the seal plate attached to the wall portion to cooperatively encapsulate the thrust bearing member for rotation therebetween; wherein the wall portion has a recessed surface that defines a thrust pocket that receives the thrust bearing member, the thrust bearing member support surface covering over the thrust pocket and the thrust bearing member; the seal plate including an aperture arranged radially outwards of the thrust pocket that fluidly connects the area to the fluid flow path.

2. The turbomachine of claim 1, wherein the flow surface is concavely contoured.

3. The turbomachine of claim 2, wherein the first face includes an outer radial portion that faces axially along the axis, and wherein the first face includes an inner radial portion that curves and projects axially as the inner radial portion extends away from the outer radial portion.

4. The turbomachine of claim 3, wherein the rotating group includes an extension that is received in the seal plate, the extension including an extension flow surface that is disposed in a downstream direction from the flow surface of the seal plate, the extension flow surface further defining the fluid flow path toward the compressor wheel.

5. The turbomachine of claim 4, wherein the fluid flow path turns inward radially along the flow surface of the seal plate, and wherein the fluid flow path turns axially along the extension flow surface.

6. The turbomachine of claim 1, wherein the aperture is a through-hole extending through the seal plate.

7. The turbomachine of claim 1, wherein the housing includes a motor cavity that houses an e-machine, the aperture fluidly connecting the motor cavity to the fluid flow path.

8. The turbomachine of claim 1, wherein the wall portion includes a recess defined by the recessed surface, the recess including an inlet area with a fluid inlet to the thrust pocket;

wherein the thrust pocket is substantially centered on the axis and the inlet area is eccentric to the axis.

9. The turbomachine of claim 8, wherein the thrust bearing member support surface is flat and continuously covers the inlet area and the thrust pocket.

10. The turbomachine of claim 9, further comprising a compressible seal member that continuously extends about the inlet area and the thrust pocket and seals between the seal plate and the wall portion.

11. The turbomachine of claim 1, wherein the seal plate includes an inner radial surface that is smooth; and wherein the rotating group includes a plurality of seal features that cooperatively defines, with the inner radial surface, a labyrinthine seal along the axis between the rotating group and the housing.

12. The turbomachine of claim 1, wherein the compressor stage is a first compressor stage; and further comprising a second compressor stage cooperatively defined by the housing and the rotating group, the second compressor stage configured to receive the fluid from the first compressor stage.

13. A method of manufacturing a turbomachine comprising:

providing a housing;

providing a rotating group;

housing the rotating group within the housing; and supporting, with a fluid bearing system, the rotating group within the housing for rotation about an axis of rotation, the fluid bearing system including a thrust bearing member fixed to the rotating group, the thrust bearing member configured to support the rotating group against thrust loads;

defining a compressor stage that includes a compressor wheel of the rotating group that is housed within a compressor housing of the housing, the compressor stage configured to receive a fluid from an area within the housing;

the housing including a seal plate that includes a first face and a second face, the first face having a flow surface that at least partly defines a fluid flow path toward the compressor wheel, the second face having a thrust bearing member support surface; the housing including a wall portion; and attaching the seal plate to the wall portion to cooperatively encapsulate the thrust bearing member for rotation therebetween; wherein the wall portion has a recessed surface that defines a thrust pocket that receives the thrust bearing member, the thrust bearing member support surface covering over the thrust pocket and the thrust bearing member; the seal plate including an aperture arranged radially outwards of the thrust pocket that fluidly connects the area to the fluid flow path.

14. The method of claim 13, wherein the flow surface is concavely contoured.

15. The method of claim 14, wherein the first face includes an outer radial portion that faces axially along the axis, and wherein the first face includes an inner radial portion that curves and projects axially as the inner radial portion extends away from the outer radial portion.

16. The method of claim 15, wherein the rotating group includes an extension that is received in the seal plate, the extension including an extension flow surface that is disposed in a downstream direction from the flow surface of the seal plate, the extension flow surface further defining the fluid flow path toward the compressor wheel.

17. The method of claim 16, wherein the fluid flow path turns inward radially along the flow surface of the seal plate, and wherein the fluid flow path turns axially along the extension flow surface.

18. The method of claim 13, wherein the aperture is a through-hole extending through the seal plate.

19. A compressor device comprising:

a housing;

a rotating group that is housed within the housing, the rotating group and the housing cooperating to define a first compressor stage and a second compressor stage;

a fluid bearing system with a thrust bearing member, the fluid bearing system fixed to the rotating group, the fluid bearing system configured to support the rotating group for rotation within the housing about an axis with, the thrust bearing member configured to support the rotating group against thrust loads;

a motor stage including an electric motor included in a motor cavity of the housing, the electric motor operatively connected to the rotating group for driving rotation thereof;

the first compressor stage including a first compressor wheel of the rotating group that is housed within a first compressor housing of the housing, the first compressor stage configured to receive a fluid from an area within the housing;

the second compressor stage including a second compressor wheel of the rotating group that is housed within a second compressor housing of the housing, the second compressor stage configured to receive the fluid from the first compressor stage;

a seal plate of the housing, the seal plate including a first face and a second face, the first face having a flow surface that at least partly defines a fluid flow path toward the first compressor wheel, the second face having a thrust bearing member support surface configured to support the thrust bearing member during rotation of the rotating group; and a wall portion of the housing, the seal plate attached to the wall portion to cooperatively encapsulate the thrust bearing member for rotation therebetween; wherein the wall portion has a recessed surface that defines a thrust pocket that receives the thrust bearing member, the thrust bearing member support surface covering over the thrust pocket and the thrust bearing member; the seal plate including a through-hole arranged radially outwards of the thrust pocket that fluidly connects the motor cavity to the fluid flow path.

* * * * *